United States Patent
Lee et al.

(10) Patent No.: US 12,422,032 B2
(45) Date of Patent: Sep. 23, 2025

(54) ELECTRONIC DIFFERENTIAL DISCONNECT CLUTCH

(71) Applicant: Schaeffler Technologies AG & Co. KG, Herzogenaurach (DE)

(72) Inventors: Brian Lee, Charlotte, NC (US); Michael Hodge, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/583,999

(22) Filed: Feb. 22, 2024

(65) Prior Publication Data

US 2024/0418251 A1    Dec. 19, 2024

Related U.S. Application Data

(63) Continuation-in-part of application No. 18/209,478, filed on Jun. 14, 2023, now Pat. No. 12,117,073.

(60) Provisional application No. 63/534,886, filed on Aug. 28, 2023.

(51) Int. Cl.
| | |
|---|---|
| F16H 48/40 | (2012.01) |
| F16H 48/08 | (2006.01) |
| F16H 48/24 | (2006.01) |
| F16H 48/34 | (2012.01) |

(52) U.S. Cl.
CPC ............ *F16H 48/40* (2013.01); *F16H 48/08* (2013.01); *F16H 48/24* (2013.01); *F16H 2048/346* (2013.01); *F16H 2048/405* (2013.01)

(58) Field of Classification Search
CPC .......... F16H 48/08; F16H 48/24; F16H 48/34; F16H 48/40; F16H 2048/343–346; F16H 2048/405
See application file for complete search history.

(56) References Cited

U.S. PATENT DOCUMENTS

| | | | |
|---|---|---|---|
| 2,069,411 A | 2/1937 | Keese | |
| 3,973,450 A * | 8/1976 | Shealy | F16H 48/08 475/86 |
| 4,703,671 A | 11/1987 | Jikihara | |
| 5,273,499 A * | 12/1993 | Friedl | F16H 48/08 475/236 |
| 6,015,361 A | 1/2000 | Yamazaki et al. | |
| 6,027,422 A | 2/2000 | Yamazaki | |

(Continued)

FOREIGN PATENT DOCUMENTS

| | | |
|---|---|---|
| CN | 212690739 U | 3/2021 |
| JP | 2002293157 A | 10/2002 |

(Continued)

*Primary Examiner* — James J Taylor, II

(57) ABSTRACT

An electronic differential disconnect clutch includes a differential unit, a first flange, a hub, a second flange, a hub sleeve and a solenoid. The differential unit has a pair of splines arranged for receiving a pair of axle shafts. The first flange has a first face spline and is fixed to the differential unit. The hub is rotatable relative to the differential unit and arranged to receive an input torque. The second flange is rotationally fixed and axially displaceable on the hub and has a second face spline arranged for engaging the first face spline. The hub sleeve is arranged to axially displace the second flange to engage the second face spline with the first face spline. The solenoid is arranged to axially displace the hub sleeve.

14 Claims, 7 Drawing Sheets

(56) References Cited

U.S. PATENT DOCUMENTS

| | | |
|---|---|---|
| 6,299,562 B1 | 10/2001 | Kim |
| 6,520,305 B2 * | 2/2003 | Dick .................. F16D 11/10 |
| | | 192/114 R |
| 7,147,584 B1 * | 12/2006 | Lu ...................... F16H 48/10 |
| | | 475/250 |
| 7,892,134 B2 | 2/2011 | Fusegi |
| 8,221,278 B2 | 7/2012 | Biermann et al. |
| 8,444,322 B2 | 5/2013 | Langer et al. |
| 8,562,477 B2 | 10/2013 | Mizoguchi |
| 9,157,515 B2 | 10/2015 | Downs et al. |
| 10,052,950 B2 | 8/2018 | Nett et al. |
| 10,391,861 B2 | 8/2019 | Richards et al. |
| 10,415,682 B2 | 9/2019 | Hirota et al. |
| 11,142,066 B2 * | 10/2021 | Ekonen ................ F16D 13/46 |
| 11,231,098 B2 | 1/2022 | Swinger |
| 11,555,538 B2 | 1/2023 | Lee et al. |
| 11,608,879 B2 | 3/2023 | Lee et al. |
| 11,686,380 B2 | 6/2023 | Cao et al. |
| 11,828,355 B1 | 11/2023 | Yang et al. |
| 11,885,399 B2 * | 1/2024 | Yaguchi ................ F16H 48/24 |
| 11,920,666 B2 | 3/2024 | DeLand et al. |
| 12,025,213 B2 * | 7/2024 | Liu ...................... F16H 48/40 |
| 12,066,088 B2 * | 8/2024 | Verhoog ................ F16H 48/42 |
| 12,234,901 B2 * | 2/2025 | Lee ...................... F16H 48/34 |
| 2017/0130815 A1 | 5/2017 | Wang et al. |
| 2018/0029471 A1 | 2/2018 | Richards et al. |
| 2019/0264755 A1 | 8/2019 | Giehl et al. |
| 2020/0300348 A1 | 9/2020 | Koerschner et al. |
| 2022/0176813 A1 | 6/2022 | McBride et al. |
| 2023/0417310 A1 | 12/2023 | Verhoog et al. |
| 2024/0301943 A1 * | 9/2024 | Barillot ................ F16H 48/30 |
| 2024/0408960 A1 * | 12/2024 | Yang ...................... B60K 17/02 |

FOREIGN PATENT DOCUMENTS

| | | |
|---|---|---|
| JP | 2007071223 A | 3/2007 |
| WO | 2022217355 A1 | 10/2022 |
| WO | WO-2024023249 A1 * | 2/2024 ............ F16H 48/30 |
| WO | 2024234218 A1 | 11/2024 |

* cited by examiner

ELECTRONIC DIFFERENTIAL DISCONNECT CLUTCH

CROSS-REFERENCE TO RELATED APPLICATIONS

This application is a continuation-in-part of U.S. Non-provisional patent application Ser. No. 18/209,478, filed Jun. 14, 2023, and claims the benefit of U.S. Provisional Patent Application No. 63/534,886, filed Aug. 28, 2023, the disclosures of which are incorporated in their entirety by reference herein.

TECHNICAL FIELD

The present disclosure relates generally to a differential disconnect clutch, and more specifically to an electronic differential disconnect clutch.

BACKGROUND

Disconnecting differentials are known. One example is shown and described in U.S. Pat. No. 10,391,861 titled AXLE ASSEMBLY WITH DISCONNECTING DIFFERENTIAL OUTPUT to Richards et al. Also, disconnect mechanisms in differentials are known. One example is shown and described in PCT Publication No. WO 2022/217355 titled DISCONNECTING DIFFERENTIAL SIDE GEAR MECHANISM to MAGNA POWERTRAIN, INC.

SUMMARY

Example embodiments broadly comprise an electronic differential disconnect clutch including a differential unit, a first flange, a hub, a second flange, a hub sleeve and a solenoid. The differential unit has a pair of splines arranged for receiving a pair of axle shafts. The first flange has a first face spline and is fixed to the differential unit. The hub is rotatable relative to the differential unit and arranged to receive an input torque. The second flange is rotationally fixed and axially displaceable on the hub and has a second face spline arranged for engaging the first face spline. The hub sleeve is arranged to axially displace the second flange to engage the second face spline with the first face spline. The solenoid is arranged to axially displace the hub sleeve.

In some example embodiments, the differential unit includes a first differential housing half with a first annular surface and a second differential housing half fixed to the first differential housing half. The second differential housing half has a second annular surface contacting the first annular surface. In an example embodiment, the first differential housing half is made by forging and the second differential housing half is made by stamping. In an example embodiment, the first differential housing half is supported on the hub by a first axial bearing and a first radial bearing and the second differential housing half is supported by a second axial bearing and a second radial bearing.

In some example embodiments, the electronic differential disconnect clutch also includes a plurality of balls. The hub has a plurality of tapered slots, the hub sleeve has a plurality of holes and each of the plurality of balls is disposed in a respective one of the plurality of tapered slots and the plurality of holes. In some example embodiments, the electronic differential disconnect clutch also includes an actuator sleeve with a tapered ring arranged to radially displace the plurality of balls in the plurality of tapered slots when the actuator sleeve is axially displaced by the solenoid. In an example embodiment, the electronic differential disconnect clutch also includes a spring arranged to axially displace the actuator sleeve when the solenoid is de-energized. In an example embodiment, the solenoid includes a coil and a displaceable ring arranged to axially displace the actuator sleeve when the coil is energized.

In an example embodiment, the hub sleeve is fixed to the second flange. In an example embodiment, the hub sleeve includes axially extending fingers extending through respective slots in the hub and fixed to the second flange. In some example embodiments, the electronic differential disconnect clutch also includes an outer housing with a first housing half including an annular ring, a drive gear bolted to the annular ring, and a second housing half fixed to the drive gear. In an example embodiment, the drive gear has a circumferential notch with an axially protruding portion and the second housing half is fixed to the axially extending portion. In an example embodiment, the drive gear is bolted to the annular ring by a plurality of bolts circumferentially distributed at a bolt radius, and the second housing half is fixed to the drive gear at a fixing radius that is less than the bolt radius. In some example embodiments, the hub is fixed to the second housing half. In an example embodiment, the first flange and the second flange are disposed axially between the drive gear and the hub fixing to the second housing half. In an example embodiment, the electronic differential disconnect clutch also includes a ball bearing disposed radially outside of the hub fixing to the second housing half.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
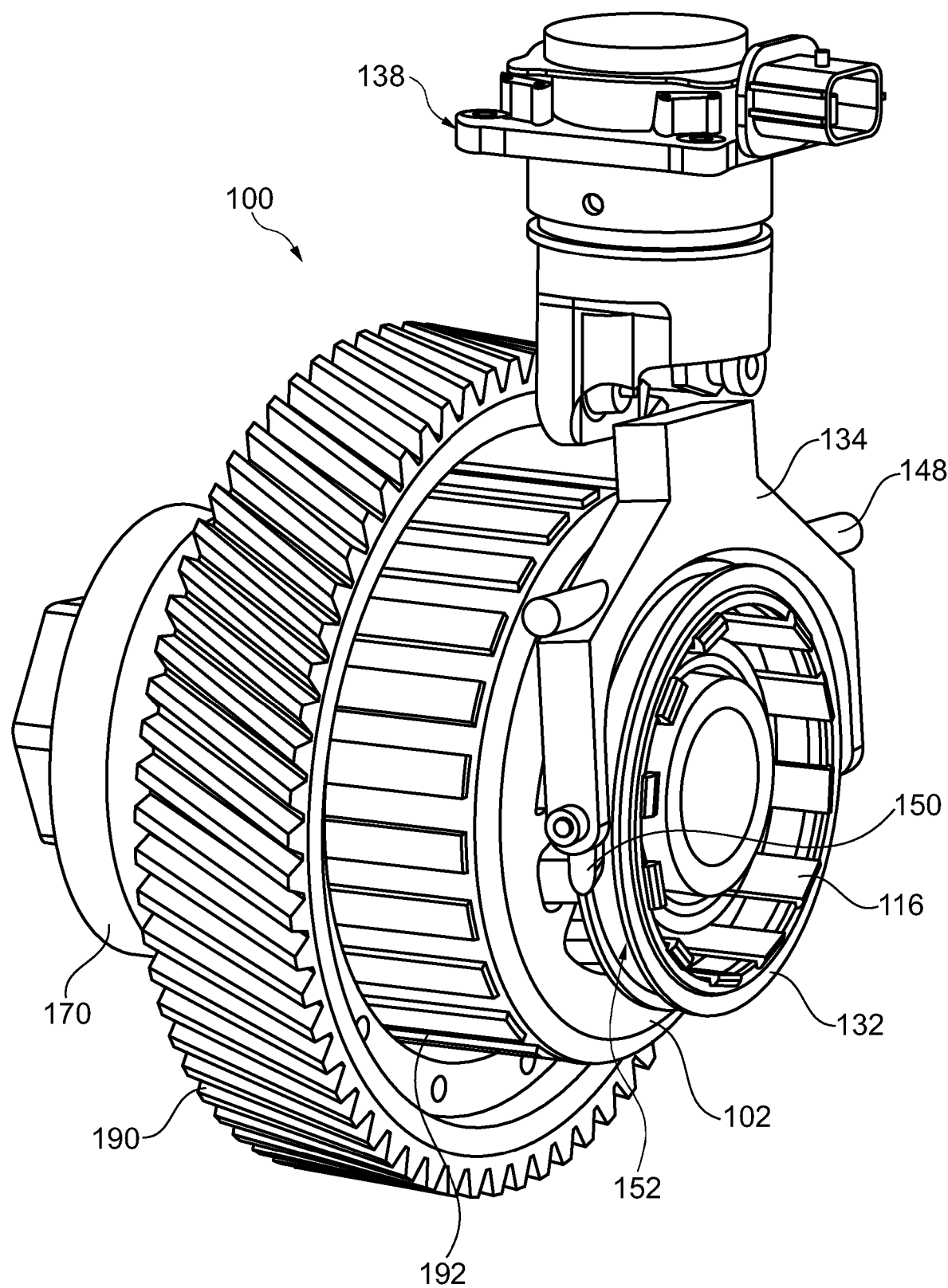
FIG. 1 illustrates a perspective view of a differential disconnect system, according to a first example embodiment.
Figure 2:
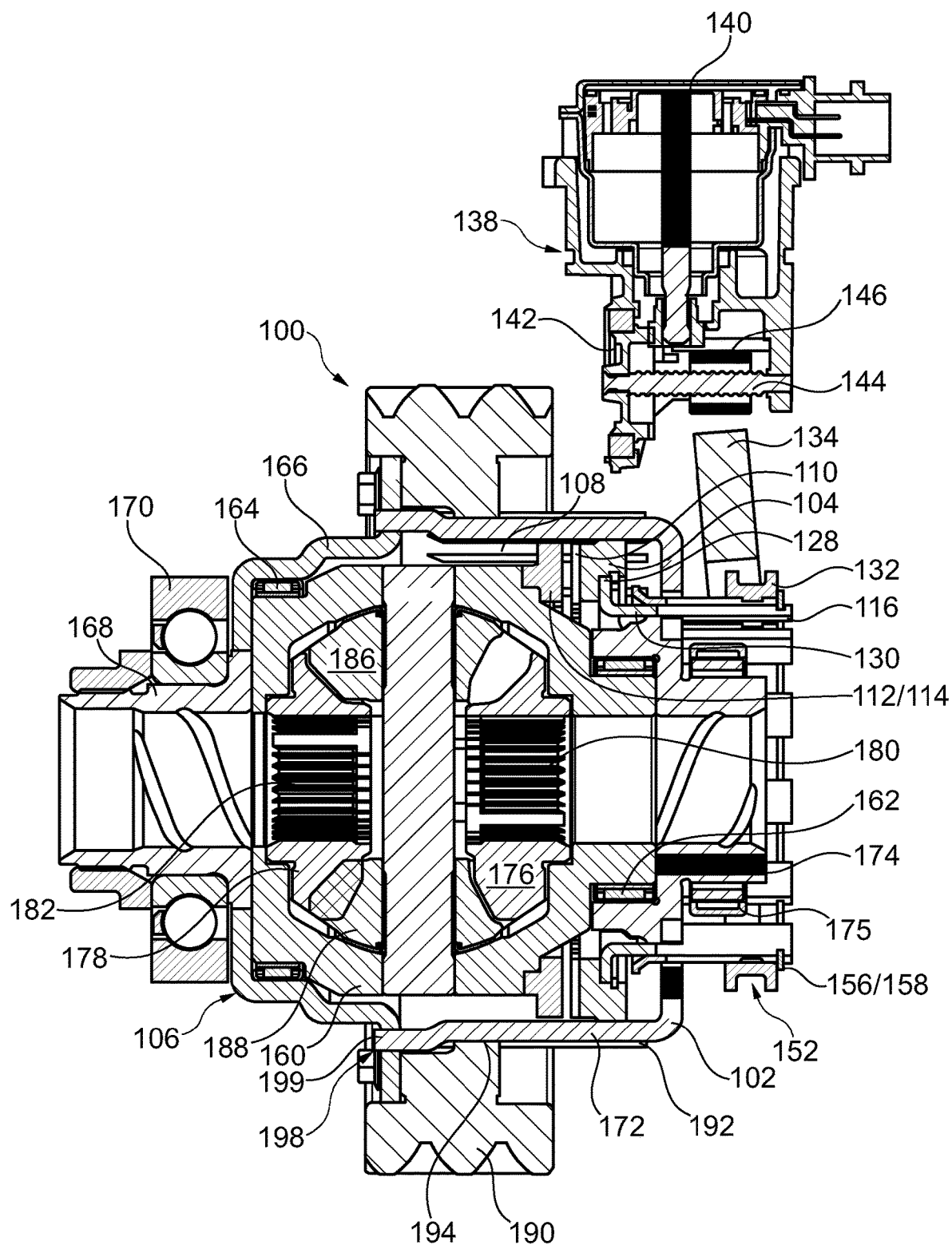
FIG. 2 illustrates a cross-sectional view of the differential disconnect system of FIG. 1.
Figure 4:
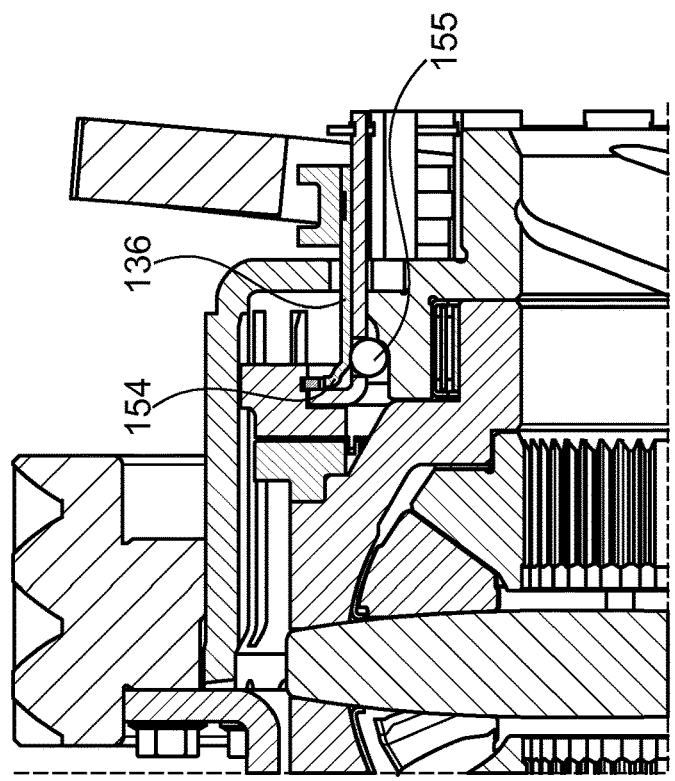
FIG. 4 illustrates a detail cross-sectional view of the differential disconnect system of FIG. 1 shown in an engaged position.
Figure 3:
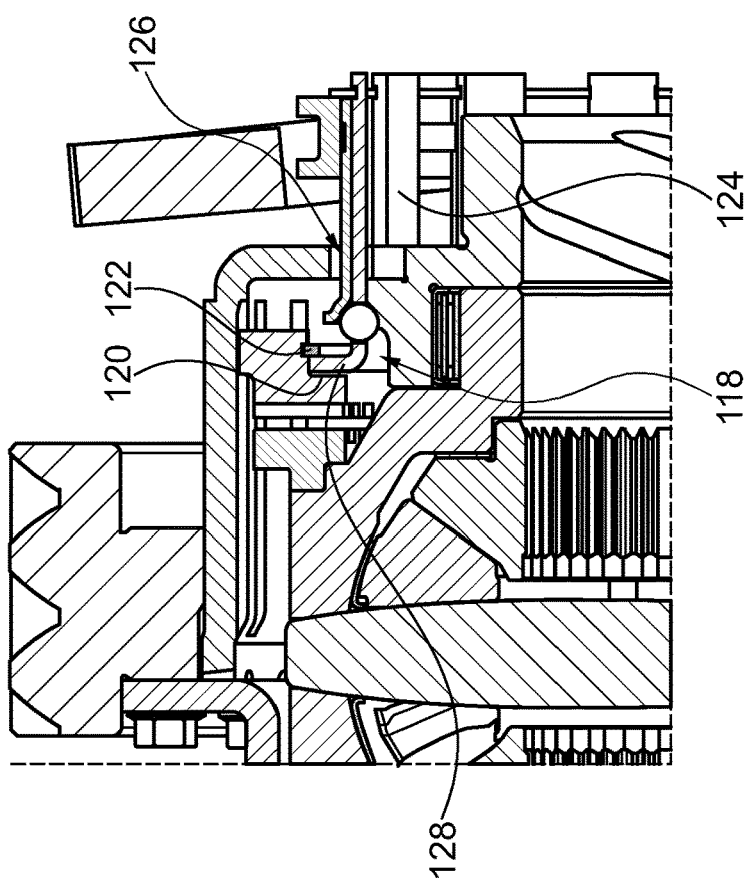
FIG. 3 illustrates a detail cross-sectional view of the differential disconnect system of FIG. 1 shown in a disconnected position.
Figure 5:
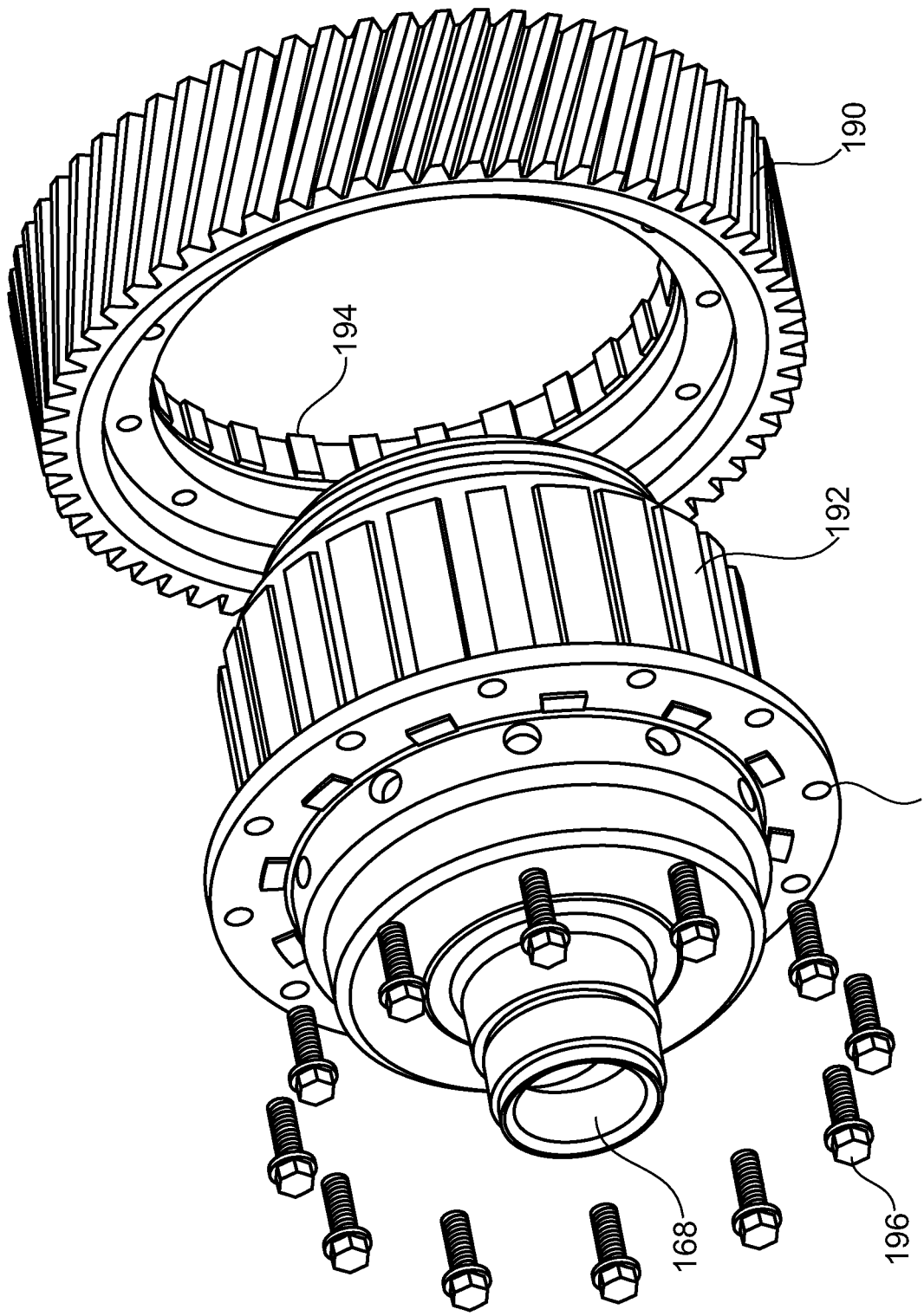
FIG. 5 illustrates a perspective partial exploded view of the differential disconnect system of FIG. 1.

The following description is made with reference to FIGS. 1-5. FIG. 1 illustrates a perspective view of differential disconnect system 100. FIG. 2 illustrates a cross-sectional view of the differential disconnect system of FIG. 1. FIG. 3 illustrates a detail cross-sectional view of the differential disconnect system of FIG. 1 shown in a disconnected position. FIG. 4 illustrates a detail cross-sectional view of the differential disconnect system of FIG. 1 shown in an engaged position. FIG. 5 illustrates a perspective partial exploded view of the differential disconnect system of FIG. 1.

Differential disconnect system 100 may be arranged in a vehicle. For example, on some electric vehicles, it may be desirable to disconnect an axle from an electric motor to avoid rotational losses through gears and/or the motor. System 100 allows free rotation of vehicle axle shafts without rotation of a final drive gear or an electric motor for improved efficiency. As will be discussed below, the differential disconnect system may be engaged and disengaged by an electric actuator to connect and disconnect the drive gear and motor to the axle shafts.

Differential disconnect system 100 includes housing 102 arranged to receive a motor torque (e.g., from an electric motor, not shown), clutch element 104 and differential unit 106 arranged for driving engagement with a pair of axle shafts (not shown). Housing 102 includes radially inwardly facing teeth 108 and clutch element 104 is drivingly engaged with and axially slidable on the radially inwardly facing teeth. Clutch element 104 includes face spline 110 and differential unit 106 includes clutch element 112 with face spline 114 arranged to engage face spline 110 for selective torque transmission between the housing and the differential unit. In other words, when the face splines are engaged, torque (e.g., motor torque) is transmitted from the housing to the differential unit and road torque (e.g., from the axle shafts) is transmitted from the differential unit to the housing. By face splines, we mean a complementary set of radially-extending teeth that can be engaged for torque transmission when the two splines are axially pressed together. An example face spline is shown and described in commonly-assigned U.S. Pat. No. 8,444,322 titled FACE SPLINE FOR A DRIVEN WHEEL HUB to Langer et al., hereby incorporated by reference as if set forth fully herein. Although the above reference shows angled teeth, face splines 110 and 114 may be any axially engaged set of radially extending teeth (e.g., flat-sided teeth as shown in the Figures).

Differential disconnect system 100 includes actuation arm 116 extending through the housing to axially displace clutch element 104 to engage and disengage with clutch element 112. Actuation arm 116 includes ring portion 118 axially fixed to clutch element 104 between radial wall 120 of clutch element 104 and snap ring 122, for example, and axial protrusions 124 extending through respective openings 126 in the housing. Ring portion 118 includes annular portion 128 and cylindrical portion 130, and protrusions 124 extend from the cylindrical portion. Shift sleeve 132 is arranged for displacement by shift fork 134 (via shift ring 136) to displace the actuation arm. That is, electric actuator 138 includes electric motor 140 that operates gear train 142 to rotate ball screw 144. Ball nut 146 is engaged with ball screw 144 and is axially displaced when the ball screw rotates, pivoting the shift fork about pins 148. Pivotable tabs 150 are disposed in groove 152 of sleeve 132 to axially displace the sleeve. Sleeve 132 is engaged with shift ring 136 so that displacement of the sleeve displaces the ring. Ring 136 includes distal end 154 arranged to contact annular portion 128 to engage the face splines. Detent ball 155 is radially displaced by ring 136 to maintain axial position of actuation arm 116 without additional forces pushing the face clutch together. Snap ring 156, disposed in grooves 158 of protrusions 124, pulls the actuation arm (and clutch element 104) to disengage the face splines when the electric actuator is reversed.

Differential unit 106 includes differential housing 160 and clutch element 112 is fixed to the differential housing by welding, for example. Although the specification specifically recites welding, other methods of fixing components together could be employed throughout. For example, adhesives, brazing, mechanical deformation (e.g., staking) or other known methods may be used to fix various components together. Differential disconnect system 100 also includes radial bearings 162 and 164 supporting differential housing 160 in housing 102. Differential housing 160 includes housing half 166 with tubular protrusion 168, supported by bearing 170 and extending away from the differential unit, and housing half 172 with tubular protrusion 174, supported by bearing 175 and extending away from the differential unit. Bearings 170 and 175 are arranged to support the differential unit in an axle housing (not shown), for example. Differential unit 106 also includes side gears 176 and 178 with inner splines 180 and 182, respectively, for driving engagement with the pair of axle shafts (not shown), shaft 184, and spider gears 186 and 188, rotatable on the shaft and each meshed with both of side gears 176 and 178.

Differential disconnect system 100 also includes final drive gear 190. Housing 102 includes radially outwardly facing teeth 192 and final drive gear 190 includes radially inwardly facing teeth 194 drivingly engaged with the radially outwardly facing teeth. Radially inwardly facing teeth 108 and radially outwardly facing teeth 192 form an undulating cylindrical portion of the housing. That is, the housing is formed such that gaps between teeth 108 form teeth 192, and vice versa, and the housing has a generally same thickness throughout the cylindrical portion. Final drive gear 190 is bolted to the housing with bolts 196, for example.

Housing half 166 includes radial flange 197 bolted to final drive gear 190 (with bolts 196, for example) and apertures 198. Housing half 172 includes axial tabs 199 extending through apertures 198. Axial tabs 199 are axially fixed in housing half 166 by riveting. That is, axially distal ends of tabs 199 extending through the apertures are "upset" (e.g., physically deformed) to fix the tabs in the apertures, thereby connecting housing halves 166 and 172 together.

Figure 7:
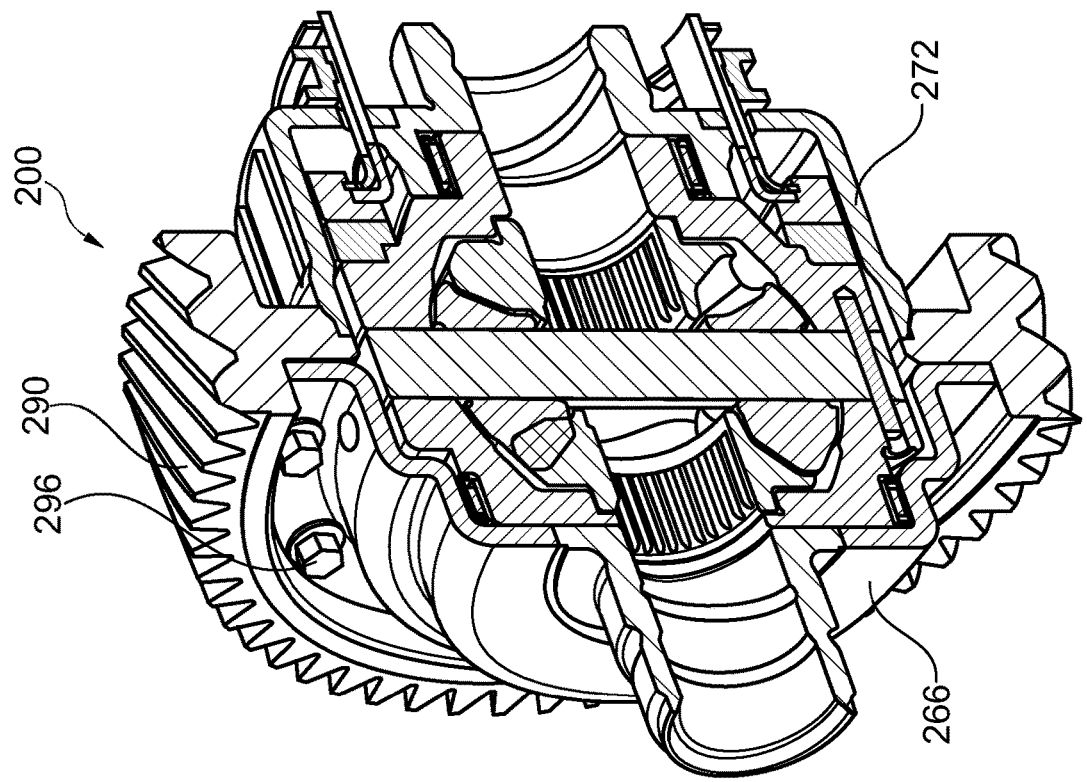
FIG. 7 illustrates a perspective cross-sectional view of the differential disconnect system of FIG. 6.
Figure 6:
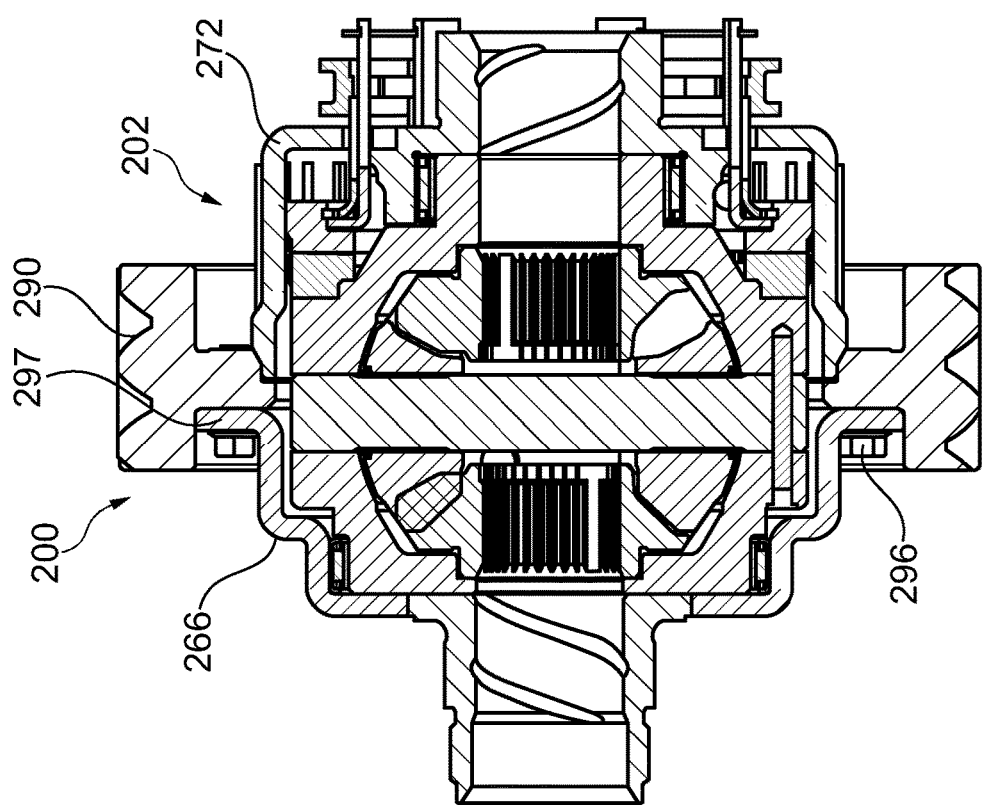
FIG. 6 illustrates a cross-sectional view of a differential disconnect system, according to a second example embodiment.
Figure 8:
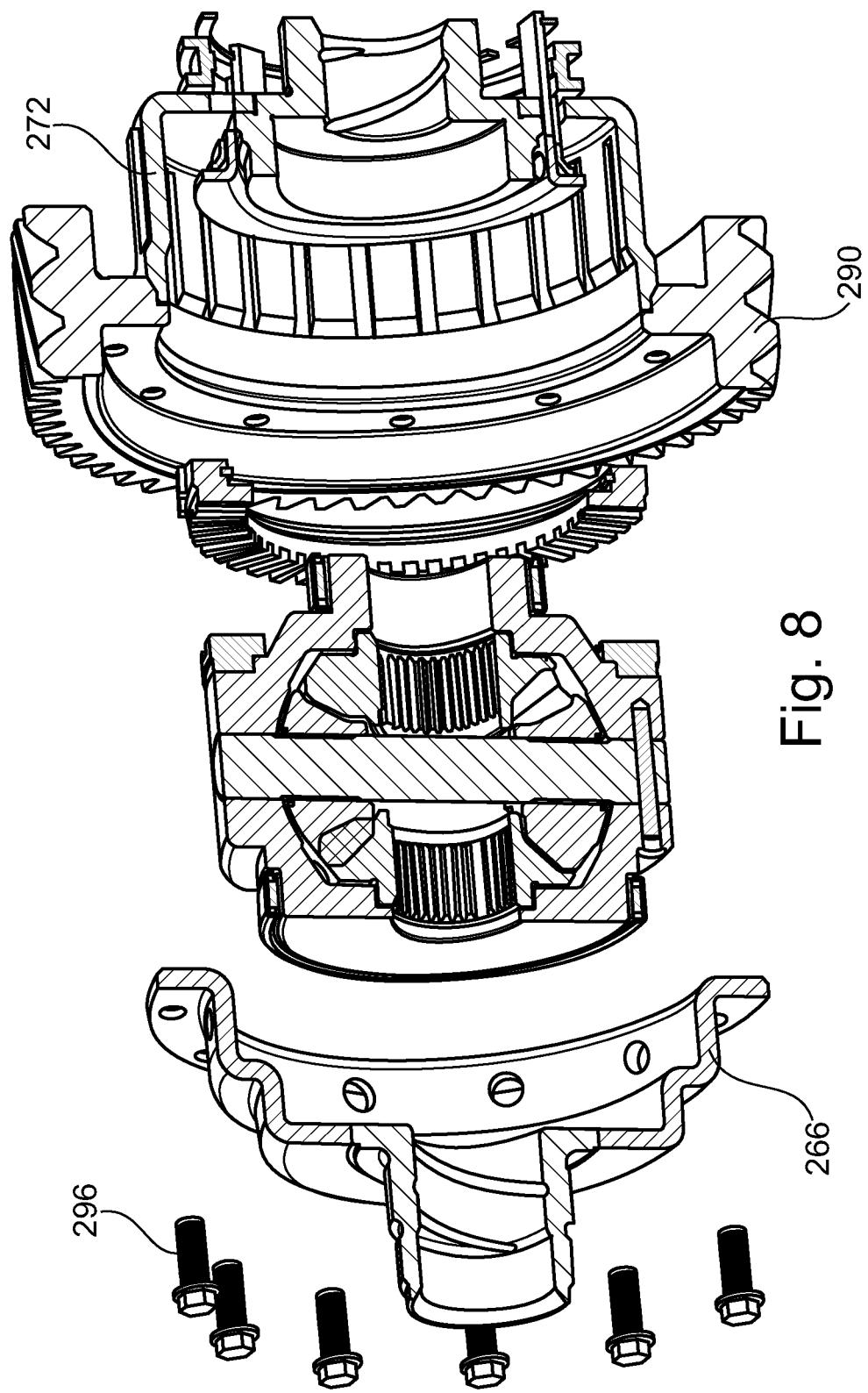
FIG. 8 illustrates a perspective cross-sectional exploded view of the differential disconnect system of FIG. 6.

The following description is made with reference to FIGS. 6-8. FIG. 6 illustrates a cross-sectional view of differential disconnect system 200. FIG. 7 illustrates a perspective cross-sectional view of the differential disconnect system of FIG. 6. FIG. 8 illustrates a perspective cross-sectional exploded view of the differential disconnect system of FIG. 6. Differential disconnect system 200 generally operates in a same manner as differential disconnect system 100 described above except as described below.

Differential disconnect system 200 includes final drive gear 290. Housing 202 includes housing half 266 with radial flange 297 bolted to the final drive gear (with bolts 296) and housing half 272 fixed to the final drive gear by welding. Contrary to differential disconnect system 100 described above, final drive gear 290 does not include radially inwardly facing teeth but is instead drivingly engaged with housing 202 by welding of housing half 272. In this case, the welded final drive gear and housing half 272 are provided as a subassembly prior to final assembly of the differential disconnect system. Once the components (e.g., differential unit 206) are installed in housing half 272, housing half 266 is bolted to the final drive gear.

Figure 9:
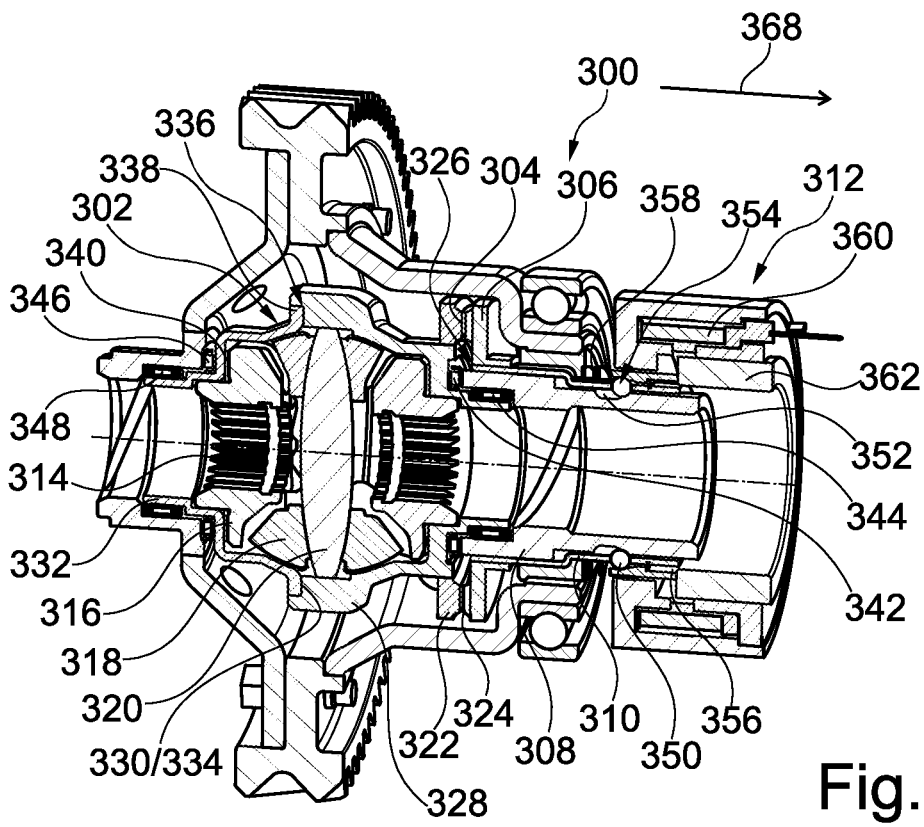
FIG. 9 illustrates a perspective cross-sectional view of an example embodiment of an electronic differential disconnect clutch shown in a disengaged position.
Figure 10:
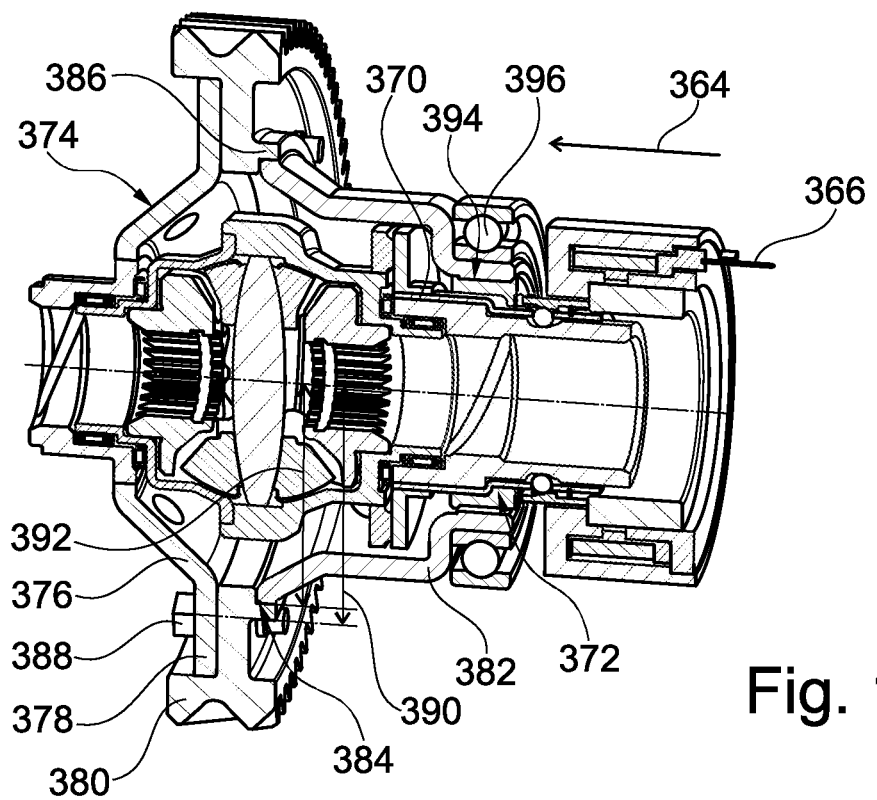
FIG. 10 illustrates a perspective cross-sectional view of the electronic differential disconnect clutch of FIG. 9 shown in an engaged position.

The following description is made with reference to FIGS. 9-10. FIG. 9 illustrates a perspective cross-sectional view of electronic differential disconnect clutch 300 shown in a disengaged position. FIG. 10 illustrates a perspective cross-sectional view of the electronic differential disconnect clutch of FIG. 9 shown in an engaged position. Electronic differential disconnect clutch 300 includes differential unit 302, flanges 304 and 306, hub 308, hub sleeve 310 and solenoid 312.

The differential unit includes splines 314 arranged for receiving a pair of axle shafts (not shown). Splines 314 are disposed on respective side gears 316. The differential unit also includes bevel gears 318 arranged on shaft 320 and drivingly engaged with the side gears. Although a bevel gear differential unit is shown, other differential units are possible. For example, differential unit 302 may be a limited slip differential, a locking differential, a helical gear differential or any other style of differential unit known in the art. Flange 304 may be fixed to the differential unit by a cutting spline or welding, for example. Flange 304 includes face spline 322 and flange 306 includes face spline 324 arranged for engaging face spline 322. By a face spline, we mean axially extending teeth circumferentially distributed at a diameter. Two face splines can be engaged by axially moving them into contact with one another so that the respective axially extending teeth transmit torque between them. The teeth may have tapered sides, straight sides, or reverse tapered sides that pull the splines tighter together under torque. An example face spline is shown and described in commonly-assigned United States Patent Publication No. 2019/0264755 titled DOG CLUTCH HAVING A SYNCHRONIZING MECHANISM to Giehl et al., hereby incorporated by reference as if set forth fully herein.

Hub 308 is rotatable relative to the differential unit and is arranged to receive an input torque as described below. Flange 306 is rotationally fixed and axially displaceable on the hub (e.g., via spline connection 326, for example. Hub sleeve 310 is arranged to axially displace the flange 306 to engage face spline 324 with face spline 322. Solenoid 312 is arranged to axially displace the hub sleeve.

Differential unit 302 includes differential housing half 328 with annular surface 330 and differential housing half 332 fixed to differential housing half 328. Differential housing half 332 includes annular surface 334 contacting annular surface 330. That is, housing half 328 includes stepped portion 336 with annular surface 330 and housing half 332 includes radially extending flange 338 with annular surface 334, and the radially extending flange is disposed in the stepped portion. Housing halves 328 and 332 are fixed together by a shrink fit, press-fit, welding, adhesives, or any known securing method. It should be noted that only housing half 328 carries torque; housing half 332 is arranged to support the side gear. Thrust bushings 340 are arranged between a respective side gear and differential housing half for reduced friction between the components.

Differential housing half 328 may be made by forging and differential housing half 332 may be made by stamping, for example. As shown in the figures, housing half 328 includes varying thickness while housing half 332 is formed with a similar thickness in all areas. Both halves may be machined at mating surfaces and mounting surfaces, for example. Differential housing half 328 is supported on hub 308 by axial bearing 342 and radial bearing 344, and differential housing half 332 is supported by axial bearing 346 and radial bearing 348. The various bearings provide axial and radial support of the differential unit relative to other components.

Electronic differential disconnect clutch 300 also includes balls 350. Hub 308 includes tapered slots 352, hub sleeve 310 includes holes 354, and each of the balls is disposed in a respective one of the tapered slots and the holes. As will be described in more detail below, balls 350 axially fix hub sleeve 310 relative to hub 308 when the electronic differential disconnect clutch is engaged (ref. FIG. 10). Electronic differential disconnect clutch 300 also includes actuator sleeve 356 with a tapered ring arranged to radially displace the balls in the tapered slots when the actuator sleeve is axially displaced by the solenoid. The tapered ring may be conical, for example. Electronic differential disconnect clutch 300 also includes spring 358 arranged to axially displace the actuator sleeve when the solenoid is de-energized. That is, solenoid 312 includes coil 360 and displaceable ring 362 arranged to axially displace the actuator sleeve in axial direction 364 when the coil is energized via wires 366 (ref. FIG. 10) and spring 358 is arranged to axially displace the actuator sleeve in axial direction 368, opposite axial direction 364, when the coil is de-energized (ref. FIG. 9). Hub sleeve 310 is fixed to flange 306. That is, hub sleeve 310 includes axially extending fingers 370 extending through respective slots 372 in the hub. Distal ends of fingers 370 are fixed to flange 306. Spline connection 326 is arranged circumferentially between fingers 370.

Electronic differential disconnect clutch 300 also includes outer housing 374 with housing half 376 including annular ring 378, drive gear 380 bolted to the annular ring and housing half 382 fixed to the drive gear. Drive gear 380 includes circumferential notch 384 with axially protruding portion 386 and housing half 382 is fixed to the axially extending portion. Drive gear 380 is bolted to the annular ring by a plurality of bolts 388 circumferentially distributed at bolt radius 390 and housing half 382 is fixed to the drive gear at fixing radius 392 that is less than the bolt radius. In other words, the bolts are arranged radially outside of the fixing between housing half 382 and the drive gear.

Hub 308 is fixed to housing half 382 at area 394. Fixing of the hub may be by a cutting spline where a spline on the hub is pressed into the housing half, deforming the housing half and joining the two components together. Other fixing methods such as welding, adhesives, or any other known fixing method are possible so long as torque is transmitted from housing half 382 to hub 308, and vice versa. As can be seen in the figures, flanges 304 and 306 are disposed axially between the drive gear and the hub fixing to housing half 382 at area 394. Electronic differential disconnect clutch 300 also includes ball bearing 396 disposed radially outside of the hub fixing to housing half 382 at area 394.

Operation of the electronic differential disconnect clutch will now be discussed. The default position of the clutch is disengaged so that, when no power is provided to the solenoid, the clutch does not transmit torque. This is that state shown in FIG. 9. Torque from the drive gear is transmitted to housing half 382, hub 308 and flange 306 but is not transmitted to flange 304 because face splines 322 and 324 are not engaged. Spring 358 displaces sleeve 356 in direction 368, pulling sleeve 310 and flange 306 away from flange 304. In the example embodiment shown, solenoid 312 only works in one direction to move ring 362 in direction 364. Spring 358 moves the ring in direction 368 when force from the solenoid is less than force from the spring.

Energizing the solenoid through wire 366 creates a magnetic field that pulls ring 362 in direction 364 as shown in FIG. 10. The ring displaces sleeves 310 and 356 in direction 364. Sleeve 310 displaces flange 306 into flange 304 to engage face splines 322 and 324. Balls 350 are disposed in holes 354 so that axial movement of the sleeve also moves the balls to a deeper portion of tapered slot 352. The tapered ring on sleeve 356 forces the balls radially inward into the slot. Because the slot is tapered, the balls stay in the deeper part so long as the sleeve radially surrounds them. Thus, only a minimal force from the solenoid is required but the face splines are still held tightly together. Solenoid force must be sufficient to overcome force from spring 358 urging sleeve 356 in direction 368.

When the face splines are engaged, torque from the drive gear is transmitted to housing half 382, through hub 308 at area 394, through flange 306, face splines 324 and 322 and into flange 304. Torque from flange 304 is transmitted to differential housing half 322, through shaft 320 and bevel gears 318 to side gears 316, and to axle shafts (not shown) through splines 314. Thus, torque is transmitted between the drive gear and the axle shafts to propel the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Differential disconnect system
102 Housing
104 Clutch element (first)
106 Differential unit
108 Radially inwardly facing teeth (housing)
110 Face spline (first)
112 Clutch element (second)
114 Face spline (second)
116 Actuation arm
118 Ring portion (actuation arm)
120 Radial wall (clutch element 104)
122 Snap ring (clutch element 104)
124 Axial protrusions (actuation arm)
126 Openings (housing)
128 Annular portion (actuation arm ring portion)
130 Cylindrical portion (actuation arm ring portion)
132 Shift sleeve
134 Shift fork
136 Shift ring
138 Electric actuator
140 Electric motor
142 Gear train (electric actuator)
144 Ball screw (electric actuator)
146 Ball nut (electric actuator)
148 Pins (shift fork)
150 Pivotable tabs (shift fork)
152 Groove (shift sleeve)
154 Distal end (shift ring)
155 Detent ball
156 Snap ring (actuation arm)
158 Grooves (actuation arm axial protrusions)
160 Differential housing
162 Radial bearing (first)
164 Radial bearing (second)
166 Housing half (first)
168 Tubular protrusion (first)
170 Bearing
172 Housing half (second)
174 Tubular protrusion (second)
175 Bearing
176 Side gear
178 Side gear
180 Inner spline (side gear 176)
182 Inner spline (side gear 178)
184 Shaft
186 Spider gear
188 Spider gear
190 Final drive gear
192 Radially outwardly facing teeth (housing)
194 Radially inwardly facing teeth (final drive gear)
196 Bolts
197 Radial flange (housing half 166)
198 Apertures (housing half 166)
199 Axial tabs (housing half 172)
200 Differential disconnect system
202 Housing
266 Housing half
272 Housing half
290 Final drive gear 296 Bolts
297 Radial flange
300 Electronic differential disconnect clutch
302 Differential unit
304 Flange (first)
306 Flange (second)
308 Hub
310 Hub sleeve
312 Solenoid
314 Splines (differential unit)
316 Side gears
318 Bevel gears
320 Shaft
322 Face spline (first)
324 Face spline (second)
326 Spline connection (second flange to hub)
328 Differential housing half (first)
330 Annular surface (first, first differential housing half)
332 Differential housing half (second)
334 Annular surface (second, second differential housing half)
336 Stepped portion (first differential housing half)
338 Radially extending flange (second differential housing half)
340 Thrust bushings
342 Axial bearing (first)
344 Radial bearing (first)
346 Axial bearing (second)
348 Radial bearing (second)
350 Balls
352 Tapered slots (hub)
354 Holes (hub sleeve)
356 Actuator sleeve
358 Spring
360 Coil (solenoid)
362 Displaceable ring (solenoid)
364 Axial direction
366 Wires (solenoid)
368 Axial direction
370 Axially extending fingers (hub sleeve)
372 Slots (hub)
374 Outer housing
376 Housing half (first)
378 Annular ring (first housing half)
380 Drive gear
382 Housing half (second)
384 Circumferential notch (drive gear)
386 Axially protruding portion (circumferential notch)
388 Bolts
390 Bolt radius
392 Fixing radius (second housing half and drive gear)
394 Fixing area (hub to second housing half)
396 Ball bearing

What is claimed is:

1. An electronic differential disconnect clutch, comprising:
a differential unit comprising a pair of splines arranged for receiving a pair of axle shafts;
a first flange comprising a first face spline, the first flange fixed to the differential unit;
a hub, rotatable relative to the differential unit and arranged to receive an input torque;
a second flange, rotationally fixed to and axially displaceable on the hub, the second flange comprising a second face spline arranged for engaging the first face spline;
a hub sleeve arranged to axially displace the second flange to engage the first face spline with the second face spline, the hub sleeve comprising axially extending fingers extending through respective slots in the hub and fixed to the second flange; and
a solenoid arranged to axially displace the hub sleeve.

2. The electronic differential disconnect clutch of claim 1 wherein the differential unit comprises:
a first differential housing half comprising a first annular surface; and
a second differential housing half fixed to the first differential housing half, the second differential housing half comprising a second annular surface contacting the first annular surface.

3. The electronic differential disconnect clutch of claim 2 wherein:
the first differential housing half is made by forging; and
the second differential housing half is made by stamping.

4. The electronic differential disconnect clutch of claim 2 wherein:
the first differential housing half is supported on the hub by a first axial bearing and a first radial bearing; and
the second differential housing half is supported by a second axial bearing and a second radial bearing.

5. The electronic differential disconnect clutch of claim 1 further comprising an outer housing comprising:
a first housing half comprising an annular ring;
a drive gear bolted to the annular ring; and
a second housing half fixed to the drive gear.

6. The electronic differential disconnect clutch of claim 5 wherein:
the drive gear comprises a circumferential notch with an axially protruding portion; and
the second housing half is fixed to the axially extending protruding portion.

7. The electronic differential disconnect clutch of claim 5 wherein:
the drive gear is bolted to the annular ring by a plurality of bolts circumferentially distributed at a bolt radius; and
the second housing half is fixed to the drive gear at a fixing radius that is less than the bolt radius.

8. An electronic differential disconnect clutch, comprising:
a differential unit comprising a pair of splines arranged for receiving a pair of axle shafts;
a first flange comprising a first face spline, the first flange fixed to the differential unit;
a hub, rotatable relative to the differential unit and arranged to receive an input torque;
a second flange, rotationally fixed to and axially displaceable on the hub, the second flange comprising a second face spline arranged for engaging the first face spline;
a hub sleeve arranged to axially displace the second flange to engage the first face spline with the second face spline;
a solenoid arranged to axially displace the hub sleeve; and
a plurality of balls, wherein:
the hub comprises a plurality of tapered slots;
the hub sleeve comprises a plurality of holes; and
each of the plurality of balls is disposed in a respective one of the plurality of tapered slots and the plurality of holes.

9. The electronic differential disconnect clutch of claim 8 further comprising an actuator sleeve with a tapered ring arranged to radially displace the plurality of balls in the plurality of tapered slots when the actuator sleeve is axially displaced by the solenoid.

10. The electronic differential disconnect clutch of claim 9 further comprising a spring arranged to axially displace the actuator sleeve when the solenoid is de-energized.

11. The electronic differential disconnect clutch of claim 9 wherein the solenoid comprises:
   a coil; and
   a displaceable ring arranged to axially displace the actuator sleeve when the coil is energized.

12. An electronic differential disconnect clutch, comprising:
   a differential unit comprising a pair of splines arranged for receiving a pair of axle shafts;
   a first flange comprising a first face spline, the first flange fixed to the differential unit;
   a hub, rotatable relative to the differential unit and arranged to receive an input torque;
   a second flange, rotationally fixed to and axially displaceable on the hub, the second flange comprising a second face spline arranged for engaging the first face spline;
   a hub sleeve arranged to axially displace the second flange to engage the first face spline with the second face spline;
   a solenoid arranged to axially displace the hub sleeve; and
   an outer housing comprising:
      a first housing half comprising an annular ring;
      a drive gear bolted to the annular ring; and
      a second housing half fixed to the drive gear, wherein the hub is fixed to the second housing half.

13. The electronic differential disconnect clutch of claim 12 wherein the first flange and the second flange are disposed axially between the drive gear and the hub fixing to the second housing half.

14. The electronic differential disconnect clutch of claim 12 further comprising a ball bearing disposed radially outside of the hub fixing to the second housing half.

* * * * *